Patented Oct. 9, 1928.

1,687,312

UNITED STATES PATENT OFFICE.

KURT RIPPER, OF VIENNA, AUSTRIA, ASSIGNOR TO FRITZ POLLAK, OF VIENNA, AUSTRIA.

PROCESS FOR MANUFACTURING UREA-FORMALDEHYDE CONDENSATION PRODUCTS.

No Drawing. Application filed March 20, 1924, Serial No. 700,736, and in Austria March 31, 1923.

This invention relates to the manufacture of hard materials by condensing urea or its derivatives with formaldehyde. According to observations made hitherto, the reaction proceeds in three stages. The first stage yields initial products of a viscous nature and soluble in water; their viscosity gradually increases when they are left in the cold or heated. At a certain moment these initial products gelatinize into semi-solid intermediate products the water-solubility of which is decreased. After being further allowed to stand or being heated (whereat apparently the remainder of the water is separated) these semi-solid intermediate products are converted into insoluble hard final products which are artificial materials of great beauty and durability. The highest degree of water-resisting power is imparted to these materials only by heating them to a temperature above 80° C.

It has originally been proposed (U. S. A. Patent No. 1,355,834) to allow condensation to proceed in the absence of condensing agents for the purpose of obtaining industrially usable condensation products by the above mentioned reaction. The initial condensation products soluble in water were produced by bringing into reaction five parts by weight of a commercial 40% solution of formaldehyde and one part by weight of urea (stage 1). A larger excess of formaldehyde (6:1) and heat applied for a longer period of time caused the condensation product to remain fluid when hot, but to gelatinize, when cooling, into the elastic material of stage 2. The hard insoluble final material of stage 3 was obtained by heating to about 80° C. the material that had been allowed to gelatinize in the cold.

If in this prior method an attempt is made to turn out the final hard and insoluble material in one continuous operation with the aid of heat, a vesicular and industrially unserviceable material is obtained the faults of which are mainly imputed to free formaldehyde contained in the said material. On the other hand, if the proportion of formaldehyde be chosen less (even by a very small quantity) than that above indicated, when the procedure is as described (that is to say without resorting to condensing agents), highly clouded, semi-solid intermediate products are obtained which have not the transparency of crystal when hard. Final products having the transparency of glass and entirely free from bubbles were obtained by allowing the reaction to proceed in the presence of basic condensation agents, as described in my U. S. A. Patent No. 1,458,543 the proportion of formaldehyde being smaller than would correspond to the ratio of three molecules of formaldehyde to one of urea. This process was hitherto the only one whereby it was possible to obtain in one continuous heating operation the final products under consideration, more particularly a valuable material with the transparency of rock crystal.

Now I have found that the first part of the process initiating the reaction and yielding the water-soluble initial product, which part is completed after applying heat for a short period of time does not proceed uniformly but is divided into two stages which are strictly distinct from each other. For the sake of conciseness, the first stage is referred to hereunder as "condensation" and the second as "polymerization", which terms probably describe correctly the nature of the chemical procedures they are intended to denote.

Condensation must proceed in the absence of free hydrogen ions that is to say by adjusting the $C_H$ to a value not exceeding about $10^{-7}$, if the insoluble final material is to be perfectly transparent. The presence of free hydrogen ions at the beginning of the condensation leads to the formation of white precipitates which cannot be rendered reversible any more, so that the final product of stage 3 is necessarily clouded. If however the right course of condensation is once assured by observing the suitable conditions, a solution as clear as water is obtained, even if in starting two molecules of formaldehyde and one of urea have been used. On cooling this solution turns cloudy, but it becomes clear again when boiled and goes into a viscous mass after a prolongated period of time. This mass yields a perfectly transparent final material. The reaction of the solution need not be completely neutral; in fact the process may be worked in a basic condition since the presence of free OH-ions causes no clouding. Should the formaldehyde solution used contain free formic acid, the latter must be eliminated, preferably by the addition of basic substances at such ratio as to render the reaction neutral or slightly alkaline. In a similar manner the initial material may be formaldehyde entirely free from acid and specially prepared for the purpose for instance by sublimating a polymeric formaldehyde under the exclusion of air. The second stage, that is the stage of the polymerization, may be effected simply by further heating the condensation mixture. However, a condensation product of this kind, obtained by boiling a neutral or alkaline mixture of formaldehyde and urea for a short period of time, is converted only with difficulty into the viscous initial product soluble in water. The solution, however, becomes viscous in a comparatively short time if free hydrogen ions are added thereto after short boiling of the mixture of formaldehyde and urea, that is to say after condensation has taken place. In other words, the polymerization of the resulting condensation product into a viscous mass is advanced by adjusting the $C_H$ to a value upwards of $10^{-7}$ the possibility being also given of controlling the polymerization procedure by the nature and the quantity of the acid added. The following "polymerization agents" come under consideration as polymerization-expediting agents: acids, acid salts, acid esters and compounds turning acid owing to chemical reaction, such as for example ammonium salts which form hexamethylenetetramine with formaldehyde and liberate the acid. Furthermore, formic acid may be produced from formaldehyde in the reaction mixture by taking suitable steps, such as for example aeration, after condensation is completed.

The viscous solutions polymerized in the presence of free hydrogen ions, that is to say in an acid medium, may be gelatinized into semi-solid intermediate products by further heating in the usual way, the said intermediate products being thereafter converted into the final material. In this further procedure all steps previously found by experiment hold good in every respect. Thus, referring to my patent application Serial No. 654,260, filed July 27, 1923, it is advisable to resort to additions of alkaline substances to reduce or do away with the concentration of hydrogen ions in the viscous products before the said products are gelatinized, for the purpose of securing a faultless final material on an industrial scale.

In addition to expediting the procedure, the polymerization in an acid medium as carried out according to the invention has the great advantage of imparting to the hard insoluble final products derived from stage three of the whole reaction a considerably higher water-resisting power than was hitherto possible. A further and far weightier advantage derived from causing polymerization to preceed in an acid medium is that it is possible to produce a hitherto unknown emulsion colloid which is hydrophobe and which when cooling expels a considerable part of its water and retains the remainder thereof only in an adsorbed state. If only small quantities of a weak acid or of an acid salt of such acid are added to the reaction mixture after it is boiled for a short time, by further heating within short time a highly viscous polymerization product is obtained, which is still hydrophile to a considerable degree. If however the proportion of the added polymerizing agent exceeds this limit or if the heating is prolonged, it is possible to obtain the gel of a hydrophobe emulsion colloid which is precipitated from the aqueous reaction mixture after cooling. Of course, the concentration of the hydrogen ions may be brought to the desired degree also by adding suitably small quantities of a strong acid or of an acid salt thereof.

If a certain amount of these additions is overstepped, the reaction will take quite a different course. The whole of the reaction mixture instantly sets to a hard, white and brittle material retaining all the water. If the material is allowed to stand, the water will evaporate and the mass becomes clear and crumbles into countless fragments. In order to give an idea of the degree of concentration of hydrogen ions required for precipitating the hydrophobe gel in accordance with the invention, it may be mentioned that the process takes the above-mentioned undersirable course at a concentration expressed by $C_H = 5.10^{-3}$. This corresponds for sulphuric acid to a quantity smaller than 0.017%, reckoned on urea; or 0.034% reckoned on a mixture, free from water, of one molecule of urea and two molecules of formaldehyde.

Owing to the water adsorbed, the gel precipitated from the hydrophobe emulsion colloid is a whitish, tough and resinous material which may be washed in water and is not soluble therein. While according to the prior methods the viscous initial product was obtained only in the form of a hydrophile emulsion colloid, according to the invention a hydrophobe emulsion colloid is obtained by precipitation owing to the fact that polymerization is allowed to proceed in the presence of a suitable quantity of free hydrogen ions.

The hydrophobe gel thus produced is far more suitable for producing not only hard material but also for producing lacquers, than the hydrophile emulsion colloids which kind alone was hitherto at the disposal of industry.

As regards the manufacture of hard material, the preeminence of the products obtained according to the present process lies in that most of the water is mechanically separated when the hydrophobe colloid is formed. Furthermore, the hard final product, derived from hydrophobe emulsion colloids referred to in the foregoing, which material is mainly intended for being worked mechanically and particularly on the lathe, cannot, of course, be caused to swell by water, as the said material has a maximum degree of water-resisting power.

When the polymerization products from urea and formaldehyde produced in an acid medium according to the present invention are converted into the insoluble final material, the hydrophobe emulsion colloid must not, under any circumstances, be actually separated; on the contrary an intermediate state may be produced (by suitably proportioning the free hydrogen ions) in which at least a large proportion of the viscous polymerization product is present as a hydrophobe emulsion colloid without the gel being separated. This method of working yields industrial advantages inasmuch as the vapour pressure of the aqueous pseudo-solution of the hydrophobe colloid is considerably higher than that of a solution of a hydrophile colloid, so that the removal of the adhering water is considerably facilitated. This method of carrying out the process (i. e. preventing the emulsion colloid from being actually precipitated) means a considerable acceleration in the devolpment of the process since, as stated in the foregoing, the conversion of the substance into an insoluble final material essentially consists in the removal of the water.

Examples.

(1) 30 parts by weight of pure and neutrally reacting urea are mixed with 100 parts by weight of a 30% aqueous solution of formaldehyde which is free from acid or is neutralized or is slightly alkaline, the mixture being heated to boiling in a boiler with a reflux condenser. After short boiling 5 parts by weight of boric acid, dissolved in a little water, are added thereto; the whole mixture is thereafter further boiled in the boiler with the reflux condenser.

The reaction mass is converted after about 2½ hours into the moderately viscous solution of a yet strongly hydrophile emulsion colloid which does not become cloudy when cooling and which may be further treated according to any known process. The material is poured into moulds after most of the water is expelled and is thereafter hardened at a temperature ranging from 60 to 100° C. into a final material as transparent as crystal.

If the period of 2½ hours is exceeded and heating is continued, after 6 to 7 hours such state of the reaction mass is arrived at, that it is clear when hot but turns white on cooling, a slimy gel being separated therefrom. After being allowed to stand in the cold for several hours, the material is found to be divided in two layers. The upper layer is poured off, the tough gel forming the lower layer being repeatedly washed with water. The said gel, coloured white owing to adsorbed water, is freed from the latter in a vacuum and assumes thereafter the transparency of water; it is now ready to be poured into moulds and hardened.

The operation of extracting the gel by separating the layers as just described may be replaced by the following: The whole of the reaction material in which the colloid has become hydrophobe is evaporated in a vacuum, poured into moulds and hardened after the acid in excess is neutralized and after the free formaldehyde is bound.

(2) Boric acid may be replaced by any substance capable of splitting off free hydrogen ions in any way in the reaction mixture. The proportions of admixture and the period of time required for forming the hydrophile and hydrophobe colloid respectively vary however with the strength of the acid. Thus the quantities of the following acids must be as follows to yield the desired result: acetic acid: about 0.13 part by weight. Ammonium acetate: about 1 part by weight. Benzoic acid: about 0 1 part by weight. Sulphuric acid: traces of the order of about 0.0005 part by weight.

(3) The operation described in Examples (1) and (2) whereby an acid or an acid-reacting agent is added to the neutral or alkaline-reacting mixture after it is boiled for a short time, may be replaced by certain suitable steps (such as for example aeration) after the neutral mixture is boiled, for the purpose of allowing a small portion of the formaldehyde of the reaction mixture to be oxidized into formic acid which is intended to play the part of the acid added as described. This method of proceeding leads however in most cases only to the production of hydrophile substances because the quantity of formaldehyde oxidized into formic acid is but very small. The substance however may reach the hydrophobe stage if the oxidation of the formaldehyde is increased to the desired extent.

The intermediate and final material transparent as water produced according to the present process may be given the desired opacity and/or colour by making suitable and known additions, so that the final product is an artificial material capable of replacing not only any natural material adapted to be turned, but also semi-precious and precious stones. This artificial material may be worked in any desired mechanical way.

As to the expression "free hydrogen ions", used in the present specification, I wish to state the following.

The symbol $C_H$ represents usually grammes of hydrogen ions per liter. The hydrogen ion concentration may also be expressed by the symbol $p_H$ (chosen by Sörensen representing $-\log H$. Therefore the value $C_H = 10^{-7}$ corresponds to the value $p_H = 7$, the value $C_H = 10^{-3}$ to the value $p_H = 3$. A neutral solution is characterized by containing just as many $H'$-ions as $OH'$-ions, that is at 22° C. $10^{-7}$ of both. An acid solution contains more than $10^{-7}$ normal $H'$-ions and less than $10^{-7}$ normal $OH'$-ions, in an alkaline solution the relation is reversed. Consequently up to a $C_H$ value of $10^{-7}$ no $H'$-ions exceeding the amount of $OH'$-ions are present in the solution, but only above the value $10^{-7}$.

Instead of urea substitution products of urea may be used all of which I wish to be included along with urea in the designation "a urea" used in the following claims. The formaldehyde may be used either in the form of the commercial aqueous solution or in the gaseous state or in the form of the polymers or in that of a solution of anhydrous formaldehyde.

What I claim is:

1. A process for the manufacture of clear, crystal-like condensation products from a urea and formaldehyde which process comprises forming water-soluble initial products in two stages by adjusting the $C_H$ in the first stage, which is completed after applying heat for a short period of time, to a value not exceeding about $10^{-7}$ and in the second stage to a value upwards of $10^{-7}$ but not reaching $10^{-3}$ and then continuing the reaction by heating.

2. The process for manufacturing condensation products which consists in reacting on a urea with a solution of formaldehyde free of acid, initiating the reaction by heating the mixture for a short period of time up to boiling, adjusting the $C_H$ in the reaction mixture to a value upwards of $10^{-7}$ but not reaching $10^{-3}$ and then continuing the reaction by heating.

3. The process for manufacturing condensation products which consists in reacting on a urea with a solution of formaldehyde, the free formic acid content of which solution has been neutralized before starting the reaction, initiating the reaction by heating the mixture for a short period of time up to boiling, adjusting the $C_H$ in the reaction mixture to a value upwards of $10^{-7}$ but not reaching $10^{-3}$ and then continuing the reaction by heating.

4. The process for manufacturing condensation products which consists in reacting on a urea with a solution of formaldehyde, the free formic acid content of which solution had been neutralized by addition of agents having basic properties, before starting the reaction, initiating the reaction by heating the mixture for a short period of time up to boiling, adjusting the $C_H$ in the reaction mixture to a value upwards of $10^{-7}$ but not reaching $10^{-3}$ and then continuing the reaction by heating.

5. The process for maintaining condensation products which consists in reacting on a urea with a solution of formaldehyde, which solution had been made slightly alkaline before starting the reaction, initiating the reaction by heating the mixture for a short period of time up to boiling, adjusting the $C_H$ in the reaction mixture to a value upwards of $10^{-7}$ but not reaching $10^{-3}$, and then continuing the reaction by heating.

6. The process for manufacturing condensation products which consists in reacting on a urea with a solution of formaldehyde, the free formic acid content of which solution had been neutralized, before starting the reaction, initiating the reaction by heating the mixture for a short period of time up to boiling, and then acidifying the reaction mixture and forming a hydrophile emulsion colloid by further heating.

7. The process for manufacturing condensation products which consists in reacting on a urea with a solution of formaldehyde, the free formic acid content of which solution had been neutralized before starting the reaction, initiating the reaction by heating the mixture for a short period of time up to boiling, acidifying the reaction mixture, forming a hydrophile emulsion colloid by further heating and then continuing the reaction by heating to cause conversion of the first formed hydrophile emulsion colloid into a hydrophobe colloid.

8. The process for manufacturing condensation products which consists in reacting on a urea with a solution of formaldehyde, the free formic acid content of which solution had been neutralized before starting the reaction, initiating the reaction by heating the mixture for a short period of time up to boiling, acidifying the reaction mixture, forming a hydrophile emulsion colloid by further heating, continuing the reaction by heating until the main quantity of the water is expelled, pouring the mass thus obtained into molds and then transforming it into the hard final material by further heating.

9. The process for manufacturing condensation products which consists in reacting on a urea with a solution of formaldehyde, the free formic acid content of which solution had been neutralized before starting the reaction, initiating the reaction by heating the mixture for a short period of time up to boiling, acidifying the reaction mixture, forming a hydrophile emulsion colloid by further heating, continuing the reaction by heating the reaction product in a vacuum until the main quantity of the water is expelled therefrom, pouring the mass thus obtained into molds and then transforming it into the hard final product by further heating.

10. The process for manufacturing condensation products which consists in reacting on a urea with a solution of formaldehyde, the free formic acid content of which solution had been neutralized before starting the reaction, initiating the reaction by heating the mixture for a short period of time up to boiling, acidifying the reaction mixture, forming a hydrophile emulsion colloid by further heating, continuing the reaction by heating the reaction mixture in a vacuum until the main quantity of the water is expelled therefrom, pouring the mass thus obtained into molds and then transforming it into the hard final product by further heating up to 100 degrees centigrade.

11. The process for manufacturing condensation products, which consists in reacting on a urea with a solution of formaldehyde, the free formic acid content of which solution had been neutralized before starting the reaction, initiating the reaction by heating the mixture for a short period of time up to boiling, acidifying the reaction mixture to cause complete conversion of the first formed hydrophile emulsion colloid into a hydrophobe colloid upon further heating, continuing the heating of the reaction mass until on cooling the hydrophobe colloid is precipitated therefrom, separating the precipitated colloid from the water, repeatedly washing it with water, freeing the mass from the main quantity of the water by further heating, pouring the reaction product thus obtained into molds and hardening it.

12. The process for manufacturing condensation products which consists in reacting on a urea with a solution of formaldehyde, the free formic acid content of which solution had been neutralized before starting the reaction, initiating the reaction by heating the mixture for a short period of time up to boiling, acidifying the reaction mixture to cause complete conversion of the first formed hydrophile emulsion colloid into a hydrophobe colloid upon further heating, continuing the heating of the reaction mass until on cooling the hydrophobe colloid is precipitated therefrom, separating the precipitated colloid from the main quantity of the water, repeatedly washing it with water, freeing the mass from water by further heating in a vacuum, pouring the reaction product thus obtained into molds and hardening it.

13. The process for manufacturing condensation products which consists in reacting on a urea with a solution of formaldehyde, the free formic acid content of which solution had been neutralized before starting the reaction, initiating the reaction by heating the mixture for a short period of time up to boiling, acidifying the reaction mixture to cause complete conversion of the first formed hydrophile emulsion colloid into a hydrophobe colloid upon further heating, continuing the heating of the reaction mass until on cooling the hydrophobe colloid is precipitated therefrom, separating the precipitated colloid from the main quantity of the water, repeatedly washing it with water, freeing the mass from water by further heating in a vacuum, pouring the reaction product thus obtained into molds and hardening it by heating up to 100 degrees centigrade.

In testimony whereof I have affixed my signature.

KURT RIPPER.